July 3, 1962 J. W. FRANGOS 3,042,228
STORAGE SYSTEM
Filed Aug. 4, 1960 3 Sheets-Sheet 1

Inventor:
John W. Frangos,
by Lawrie L. Witter
Attorney

July 3, 1962 J. W. FRANGOS 3,042,228
STORAGE SYSTEM
Filed Aug. 4, 1960 3 Sheets-Sheet 2

Inventor:
John W. Frangos.
by Lawrie L. Withey
Attorney

July 3, 1962
J. W. FRANGOS
3,042,228
STORAGE SYSTEM
Filed Aug. 4, 1960
3 Sheets-Sheet 3
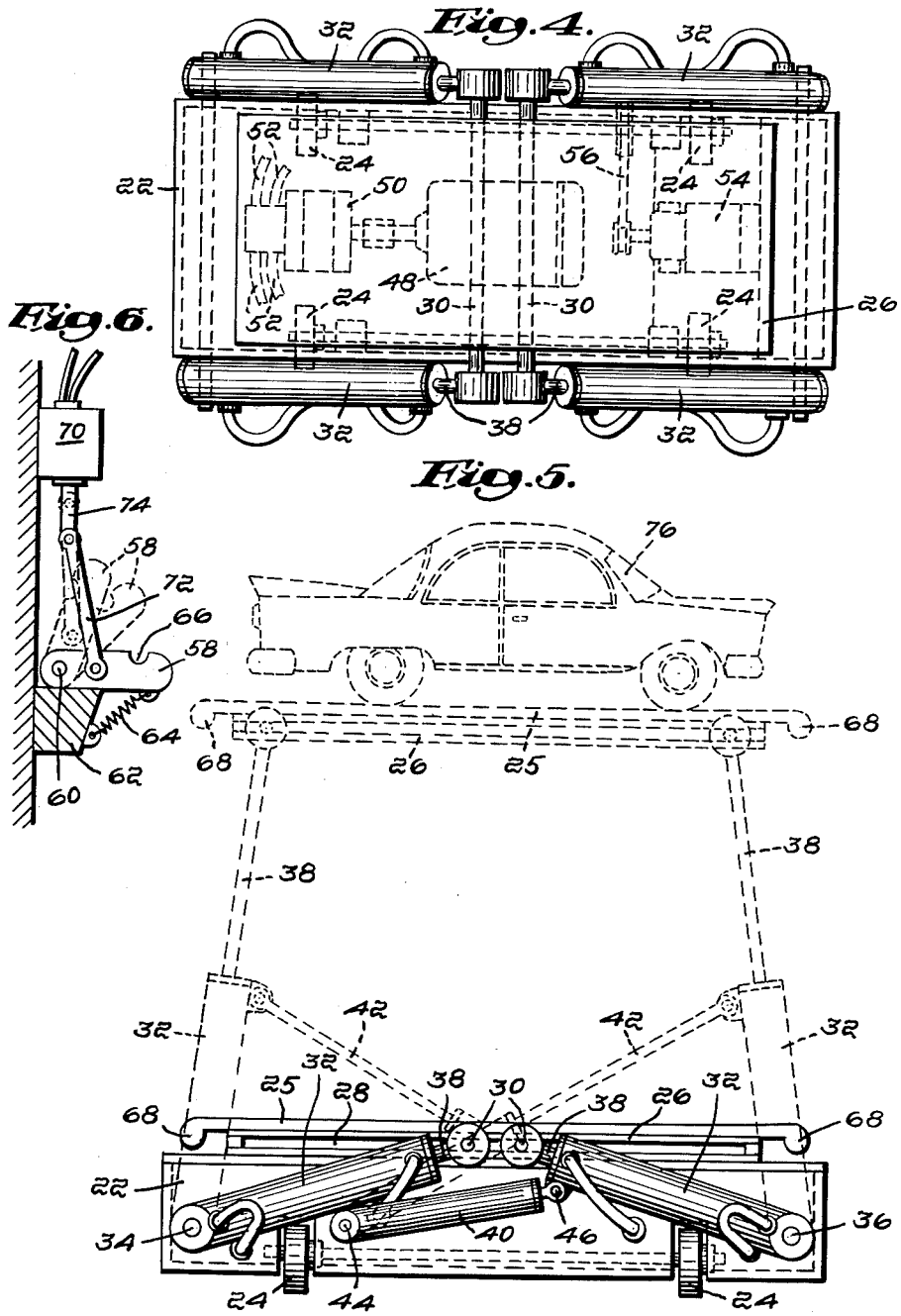
Inventor:
John W. Frangos,
by Lawrence L. Witter
Attorney United States Patent Office 3,042,228
Patented July 3, 1962

3,042,228
STORAGE SYSTEM
John W. Frangos, 2 Brimball Hill Drive, Beverly, Mass.
Filed Aug. 4, 1960, Ser. No. 47,489
8 Claims. (Cl. 214—16.1)

This invention relates to a novel storage system and apparatus for conveniently transporting and placing in storage goods to be stored and as conveniently retrieving the goods for use when desired, and since the invention is particularly applicable to the parking of automobiles, I have for convenience herein illustrated the same as employed in a parking system for motor vehicles. In developing the invention various important factors and requirements have been considered, such as obtaining maximum storage capacity for the ground space available, quick and convenient parking and retrieving of the vehicles, minimum of labor requirement, etc. To satisfy these and other requirements the invention contemplates a plurality of floors in vertically spaced relation together with an elevator to the several floors and clearance space at each floor for the free passage of vehicles or other goods to be stored and space thereabove for receiving and storing the goods. The invention also includes dollies for carrying the goods to and along the floors and cooperating means for elevating the goods from the dollies into the storage space and retaining them therein together with means for quickly and conveniently retrieving the goods when desired. The production of a novel storage system of this nature comprises a primary object of the invention.

A further feature of the invention relates more particularly to novel mechanism for conveniently transporting the goods to and from the storage space and includes a load supporting platform on each dolly together with mechanism therebeneath for elevating the platform and goods into the storage space and retaining them therein. The means for retaining the goods in the storage space is conveniently carried on the adjacent walls in position to engage and support the platform when desired and includes means for rendering the supporting means inoperative when the goods are being retrieved. The production of such mechanism comprises a further object of the invention.

These and other features of the invention hereinafter more specifically described will be best understood and appreciated from the following description of a preferred embodiment thereof selected for purposes of illustration and shown in the accompanying drawings, in which—

Figure 1:
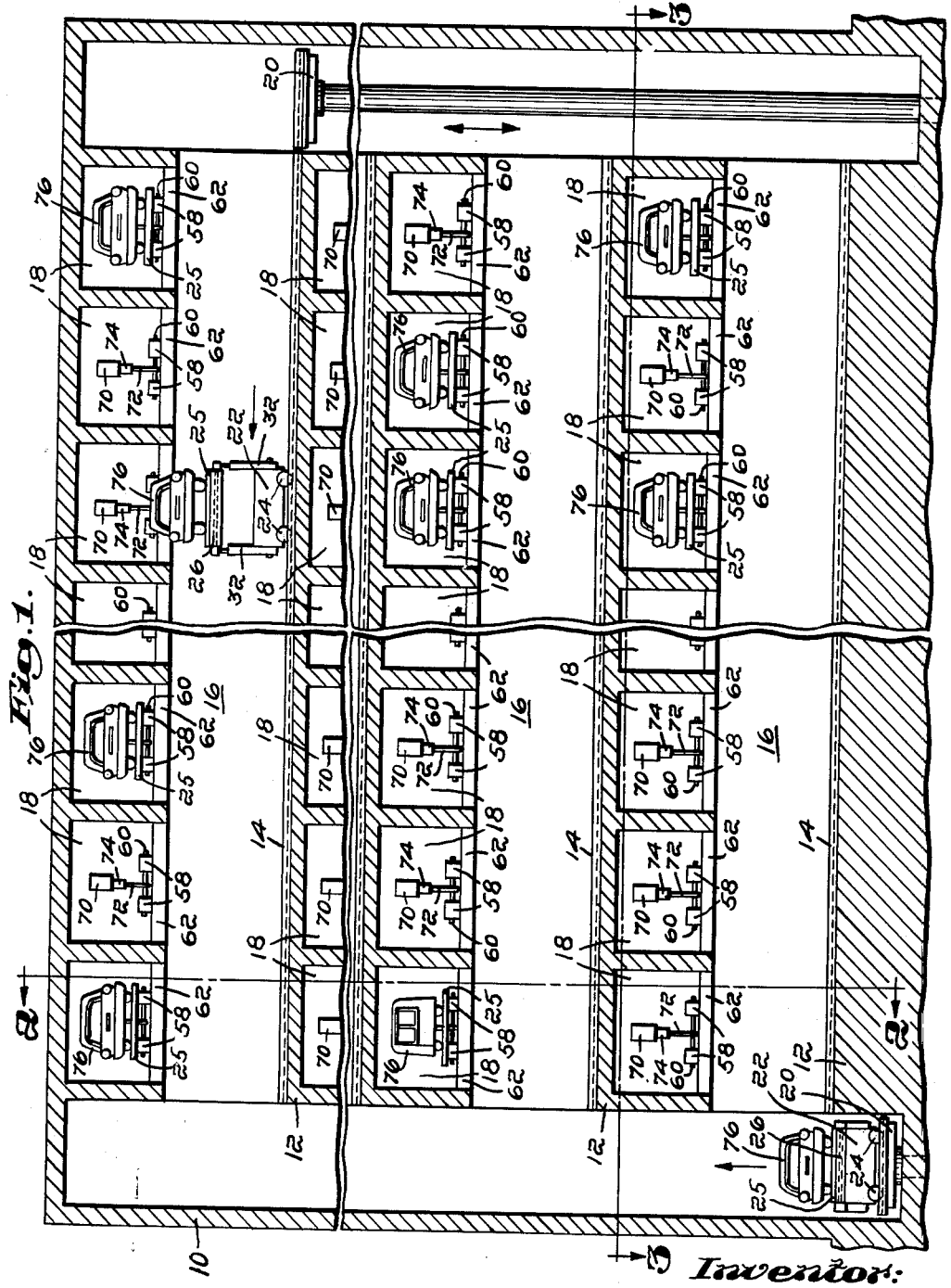
Figure 2:
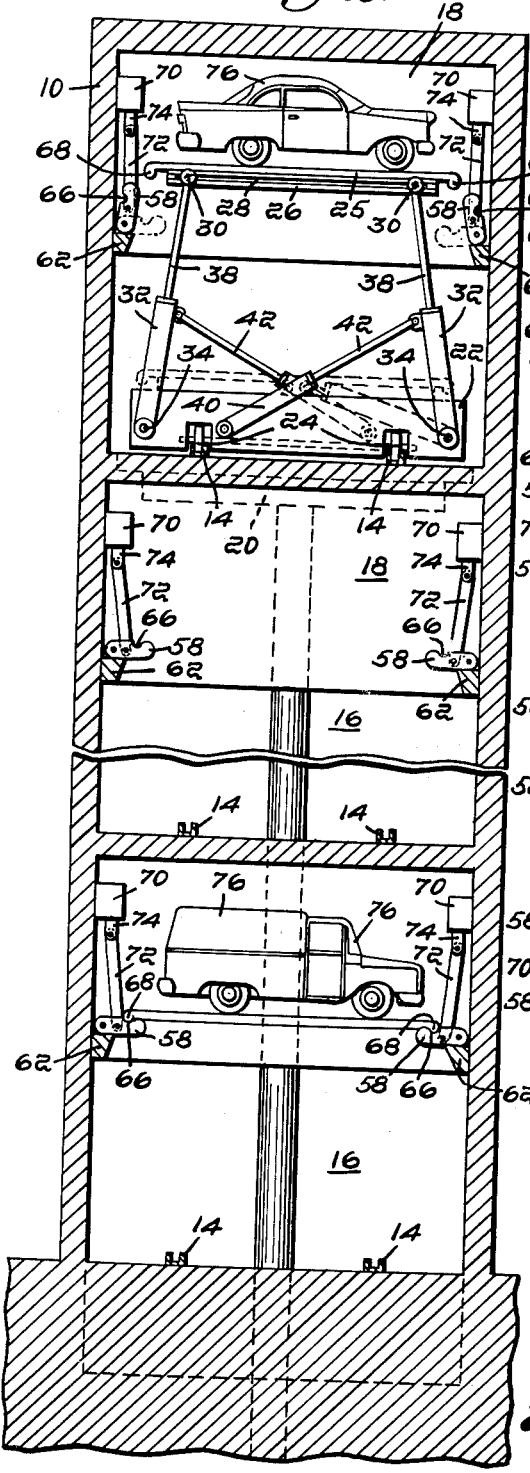
Figure 3:
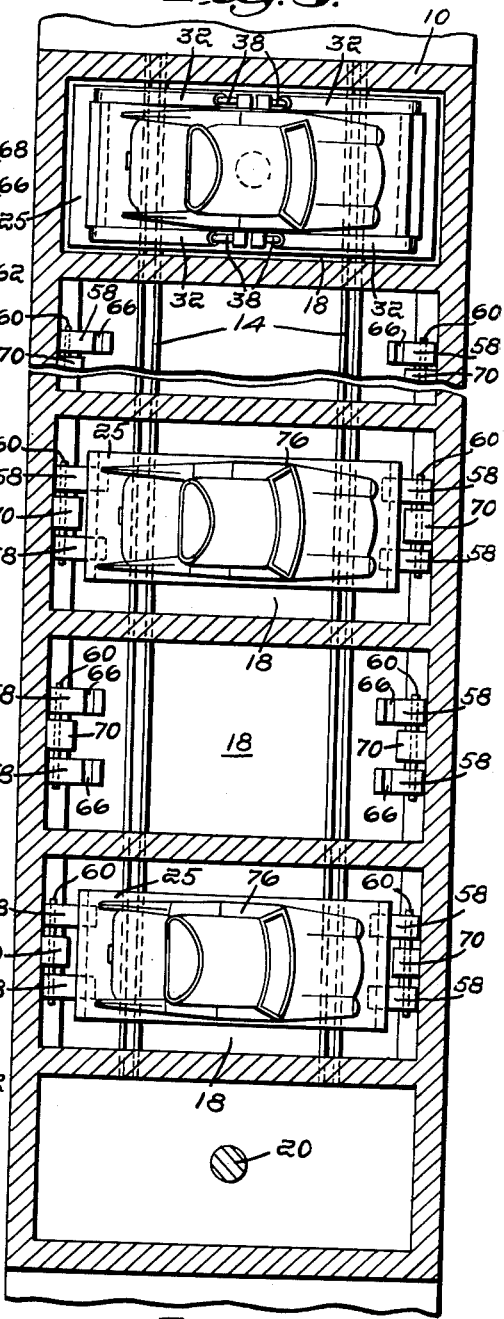

FIGURE 1 is a vertical sectional view through a building structure embodying my invention;
FIGURE 2 is an enlarged sectional view taken on line 2—2 of FIGURE 1;
FIGURE 3 is a plan sectional view taken on line 3—3 of FIGURE 1;
FIGURE 4 is a plan view of a load transporting dolly employed;
FIGURE 5 is a side elevation thereof and illustrating in broken lines the load elevating function; and
FIGURE 6 is a fragmentary view of mechanism for supporting the load in the storage chamber.

In the drawings, 10 indicates a building structure embodying a plurality of floors 12 in vertically spaced relation and each floor includes a road bed which can be provided with track rails 14. Disposed above each road bed is clearance space 16 for permitting passage of a load therealong. Disposed above and open to the clearance space 16 is storage space which as illustrated is preferably partitioned to provide a plurality of storage chambers 18 disposed horizontally along and above the clearance space 16. One or more elevators 20 are provided for serving the several floors. The invention is particularly applicable to the storage parking of automobiles and for purposes of illustration is thus herein illustrated and described.

The invention contemplates the employment of wheeled dollies for receiving and conveniently transporting the vehicles to be stored and an important feature of the invention includes a dolly having a load receiving and supporting platform together with means therebeneath for elevating the platform and vehicle into the storage space. The base support 22 of the dolly is provided with wheels 24 for running on and along the rails 14 and with a platform 25 supported horizontally on a member 26 normally resting on the dolly. The member 26 is provided with a horizontal guideway 28 therein beneath the platform and cooperating therewith are two elements 30 mounted for movement in the guideway in opposite directions toward and from the ends of the platform and adapted to be moved equally in opposite directions toward the ends of the platform by power means carried by the dolly and simultaneously therewith elevate the member and platform.

The power means illustrated in the drawings for performing this elevating function operates by fluid pressure and includes two pairs of pressure cylinders 32 pivoted to the dolly on axes 34 and 36 respectively adjacent to the ends of the platform, the two cylinders of each pair being disposed at opposite sides of the member 26. The pistons within each pair of cylinders include piston rods 38 extending outwardly of the free ends of the cylinders and connected to the ends of the adjacent element 30. When the cylinders 32 are pivoted upwardly about the axes 34 and 36, and the piston rods 38 are moved outwardly, the elements 30 are moved in the guideway equally in opposite directions toward the ends of the platform, and the member 26 and platform 25 are elevated as illustrated in broken lines in FIGURE 5. Each cylinder 32 is pivoted upwardly by a booster cylinder 40 having a piston and piston rod 42, each booster cylinder being pivoted at one end 44 to the dolly and having its piston rod 42 pivotally connected to the adjacent pressure cylinder at 46. Fluid pressure is supplied to the cylinders by an electric motor 48 and pump 50 carried on the dolly, and flexible connections 52 are provided from the pump to the cylinders. The dolly is driven by an electric motor 54 carried on the dolly and provided with driving connections 56 to the wheels 24.

I have herein illustrated the following described mechanism for supporting the platform 25 and its load in the storage chamber 18. A pair of arms 58 is pivoted at 60 to a block 62 fixed to each end wall of the chamber. Springs 64 normally hold the arms pivoted downwardly to horizontal position wherein they rest on the block. The free end portion of each arm is recessed at 66 to receive the adjacent rounded end 68 of the platform. The arms 58 can be raised to the inoperative position shown in broken lines in FIGURE 6 by a solenoid 70 fixed to the chamber wall above each arm and having a link 72 connecting the solenoid armature 74 to the arm. Energizing of the solenoids will pivot the arms upwardly as illustrated in FIGURE 6.

It will be apparent that the vehicle to be parked is driven on to the dolly-supported platform 25 at ground level and immediately raised by the elevator 20 to the required floor. The dolly is then operated to carry the vehicle to the designated storage space. The dolly-supported elevating mechanism is then operated to lift the platform and vehicle into the storage chamber 18. As the platform passes the arms 58 the ends of the platform engage and pivot the arms upwardly and the arms thereafter automatically snap back to the load supporting horizontal position beneath the platform. Lowering of the member 26 to its normal position on the dolly leaves the platform resting on the arms 58 and the vehicle 76 stored within the chamber 18 as shown at the bottom of FIGURE 2. The vehicle is retrieved by lifting the platform as illustrated at the top of FIGURE 2 and energizing the solenoids to raise the arms 58, whereupon the platform and vehicle can be lowered on to the dolly.

Parking of the vehicle on the platform within the chamber 18 leaves the dolly free for use in parking and retrieving other vehicles and leaves the load passage clearance space 16 open at all times, thus facilitating the parking and retrieving of the vehicles. It is also noted that the construction and arrangement economizes on horizontal ground space by utilizing vertically disposed parking chambers and that the requirement for manual labor is reduced to a minimum. It will be understood that the specific mechanism shown in the drawings is primarily for purposes of illustration, the scope of the invention being defined in the appended claims. It will also be understood that the various mechanisms can be locally controlled from the dolly or from a central control board if desired.

I claim:

1. A parking system for motor vehicles and the like comprising in combination, a building structure embodying a plurality of floors disposed in vertically spaced relation and including a road bed along each floor with clearance space thereabove for passage of a load and storage space above and open to the clearance space, an elevator disposed for vertical movement to the road beds, a load carrying dolly adapted to be carried on the elevator and provided with wheels for movement along the road beds, means for lifting a load from the dolly into the storage space, means for retaining the load in the storage space independently of the lifting means, and means for releasing the load retaining means.

2. The parking system defined in claim 1 in which said load lifting means is carried on the dolly and said load retaining means is carried on the walls of the storage space.

3. A parking system for motor vehicles and the like comprising in combination, a building structure embodying a plurality of floors disposed in vertically spaced relation and including a road bed along each floor with clearance space thereabove for passage of a load, means providing storage chambers disposed horizontally along and above said clearance space and open thereto, an elevator disposed for vertical movement to the road beds, a load carrying dolly adapted to be carried on the elevator and provided with wheels for movement along the road beds, means for lifting a load from the dolly into a selected storage chamber thereabove, and means for retaining the load in the selected chamber independently of the lifting means.

4. The parking system defined in claim 3 plus a load supporting platform on the dolly, said load lifting means comprising mechanism supported on the dolly beneath the platform.

5. The parking system defined in claim 4 in which said load retaining means is carried on the walls of the selected chamber and is adapted to engage and support the platform.

6. The parking system defined in claim 5 plus means for moving the load retaining means to inoperative position out of the path of movement of the platform when the platform is raised therefrom to a position thereabove.

7. The parking system defined in claim 6 in which said load retaining means comprises arms pivoted to oppositely disposed walls of the selected chamber and said means for moving the load retaining means includes links connected to the arms and adapted to pivot them upwardly to said inoperative position.

8. The combination defined in claim 1 in which the load lifting means includes in combination, a base support, a platform receiving and supporting member on the base support, a load supporting platform on the member, means providing a horizontal guideway in the member beneath the platform, two elements mounted for movement in the guideway in opposite directions toward and from the ends of the platform, and power operated mechanism carried on the base support beneath the member for moving said elements equally in opposite directions toward the ends of the platform and simultaneously therewith elevate said member and the platform.

References Cited in the file of this patent

UNITED STATES PATENTS

| 2,483,894 | Feibel | Oct. 4, 1949 |
| 2,495,046 | Wolters | Jan. 17, 1950 |
| 2,598,750 | Bargehr | June 3, 1952 |
| 2,752,051 | Strahm et al. | June 26, 1956 |

FOREIGN PATENTS

| 595,435 | Great Britain | Dec. 4, 1947 |